Oct. 16, 1956  G. A. LYON  2,767,028
WHEEL COVER
Filed Feb. 10, 1955
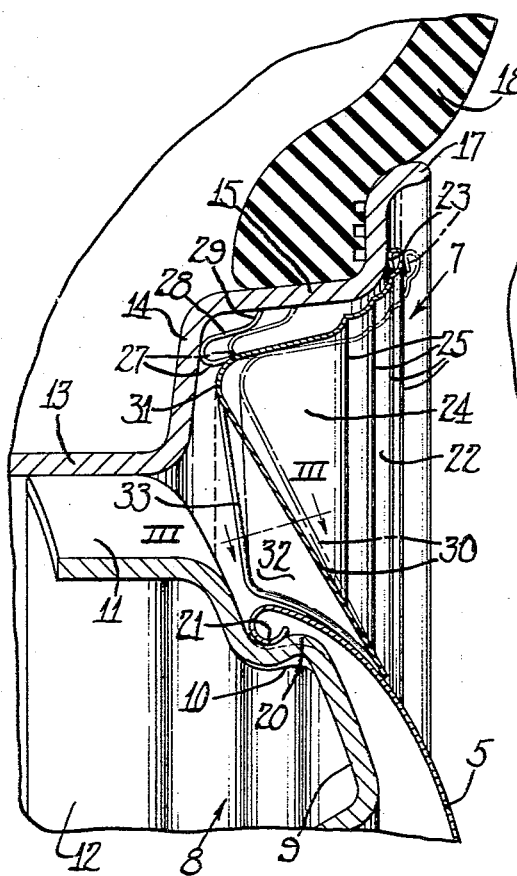
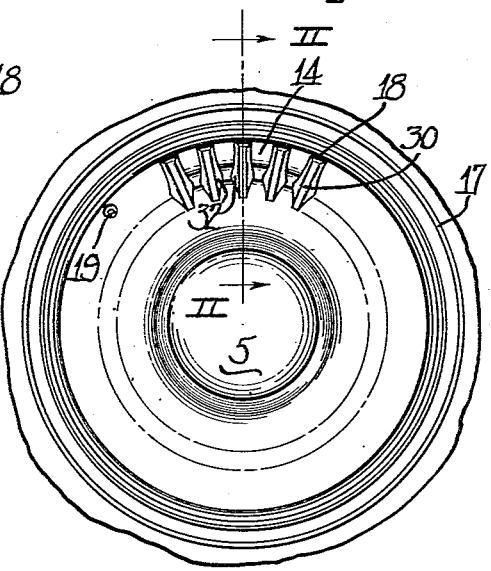
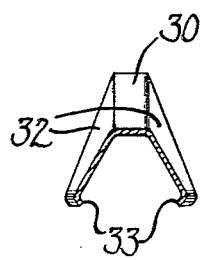
Inventor
George Albert Lyon
by Hill, Sherman, Meroni, Gross & Simpson Attys

United States Patent Office 2,767,028
Patented Oct. 16, 1956

2,767,028

WHEEL COVER

George Albert Lyon, Detroit, Mich.

Application February 10, 1955, Serial No. 487,362

8 Claims. (Cl. 301—37)

The present invention relates to improvements in wheel structures and more particularly concerns novel ornamental and protective cover means for the outer side of vehicle wheels.

An important object of the present invention is to provide an improved wheel structure having novel cover means for disposition at the outer side thereof.

Another object of the invention is to provide an improved composite cover structure for disposition at the outer side of vehicle wheels.

A further object of the invention is to provide an improved trim ring structure.

Still another object of the invention is to provide improved cover structure for the outer side of vehicle wheels enabling free circulation of air through the cover and thru wheel openings in the wheel.

Other objects, features and advantages will become readily apparent from the following detailed description of a preferred embodiment taken in conjunction with the accompanying drawing, in which:

Figure 1 is an outer side elevational view of a wheel structure embodying features of the invention;

Figure 2 is a fragmentary enlarged detail sectional view taken substantially along the line II—II of Figure 1; and Figure 3 is a fragmentary sectional view through one of the spoke elements of the cover taken substantially along the line III—III of Figure 2.

According to the present invention a cover assembly including a hub cap 5 and a trim ring member 7 are adapted for disposition at the outer side of a vehicle wheel which may embody features of the wheel structure covered in my Patent No. 2,445,330 issued July 20, 1948. Such a wheel includes a disk spider wheel body 8 having an annular nose bulge 9 provided with a generally radially outwardly facing shoulder 10 at the radially outer side thereof and spaced radially inwardly from inset wheel openings 11 in a marginal axially extending flange 12 attached in suitable fashion to a base flange 13 of a multi-flange drop center tire rim. From the base flange 13 extends generally radially outwardly a side flange 14 which merges with a generally radially and axially outwardly directed intermediate flange 15 at the axially outer side of which is a generally radially directed and then axially outwardly turned terminal flange 17. A pneumatic tire and tube assembly, or, as shown herein, a tubeless tire 18 is adapted to be supported by the tire rim. For inflating the tire a valve stem 19 projects from the side flange 14.

For snap-on-pry-off retention of the hub cap 5, the radially facing shoulder 10 of the wheel body is provided with a series, such, as three, generally radially outwardly projecting retaining bumps 20 engageable in snap-on, pry-off relation by and under turned resilient marginal bead 21 of the hub cap.

Herein the trim member 7 is constructed and arranged to effect self-retaining engagement with the tire rim and more especially the intermediate flange 15 thereof. To this end, the trim member includes an annular substantially rigid body 22 which is adapted to overlie the tire rim and more particularly the terminal flange 17 at the radially inner portion of such flange and then extends generally radially and axially inwardly around the shoulder between the terminal and intermediate flanges of the tire rim. At its outer extremity the trim body 22 is provided with an under turned reinforcing and finishing flange 23. Extending axially and radially inwardly for disposition in substantial spaced relation to the intermediate flange 15 is an inner marginal flange 24 of the trim member. For additional reinforcement and to provide pry off ribs, the body portion 22 of the trim member is provided with a series of annular indented rib shoulders 25 disposed generally opposite the juncture shoulder between the intermediate and terminal flanges 15 and 17.

For retaining engagement with the tire rim, the axially extending trim member flange 24 is provided at spaced intervals with retaining spring fingers 27 which are of a kind to enable press-on, pry-off attachment of the trim ring member. To this end the retaining fingers 27 extend generally axially inwardly from the flange 24 and are then turned generally radially outwardly and are provided with generally axially and radially outwardly extending elongated and resilient finger portions or legs 28 terminating in short and stiff generally radially outwardly directed terminals 29 engageable under resilient tension against the intermediate flange 15. Due to the short and stiff nature of the retaining terminals 29, the edges thereof will make strong gripping engagement with the inner surface of the intermediate flange 15, but upon the application of the pry-off force behind the body portion 22 of the trim member will slide axially outwardly along the face of the intermediate flange for disengagement of the trim member from the wheel.

In order to span across the space between the inner flange 24 of the trim member and the adjacent margin of the hub cap 5, the trim member is provided with a series of generally radially inwardly and axially outwardly directed resiliently attached spoke elements 30 alternating with the retaining fingers 27. In fact, the retaining fingers are adapted to be derived from material of the trim member integral in one piece with the flange 24 intermediate the spoke elements 30, in a manner as taught in my copending application Serial No. 487,361, filed of even date herewith relating to one method of making the trim member.

Each of the finger-like spoke elements 30 extends on a dished, curved resilient juncture 31 from the inner edge of the flange 24 and projects to an inner diameter enabling the spoke elements to overlie a substantial portion of the margin of the hub cap 5. Throughout most of their length, the spoke elements 30 are of a substantial rigidity, having side wing flanges 32 diverging from an elongated central portion of the body of the respective spoke elements, thus affording a substantially rigid rib-like structure. At their inner edges, the wing portions 32 of the spoke elements are provided with reinforcing and finishing inturned continuous flanges 33 extending from the resilient juncture 31 to the tip of the spoke elements. At the inner end portions thereof, the wing flanges 32 and the underturned flanges 33 are preferably arcuately conformed to and complementary with the margin of the hub cap so as to engage the same in flush relation.

Initially, that is before the trim member 7 is applied to the wheel, the spoke elements 30 extend normally to an axial position relative to the trim body 22 which is further in than when the trim member is on the wheel. Accordingly, as the trim member 7 is applied to the wheel, the tips of the spoke elements 30 will engage against the hub cap 5 in advance of the underturned flanges 33, substantially as indicated in dot dash outline in Figure 2, and then as the trim member is pressed further onto the wheel, the juncture portions 31 of the spoke elements flex as the tip portions of the spoke elements fulcrum on the hub cap and the angular relationship changes as best visualized in Figure 2 on comparison of the dot dash and full outline positions of the spoke elements 30. The end portions of the spoke elements 30 are held firmly against the hub cap in service, and further, a resilient thrust reaction is exerted toward the retaining fingers 27 and more particularly the legs 28 and the retaining terminals 29 thereof, which enhances engagement thereof with the intermediate flange 15.

It will also be observed that by virtue of the substantial openings between the spoke elements 30, air circulation through the cover assembly and the wheel openings 11 is facilitated.

It will be understood that modifications and variations may be effected without departing from the scope of the novel concepts of the present invention.

I claim as my invention:

1. In a wheel structure including a wheel body and a tire rim with retaining means on the wheel for a hub cap, a hub cap for disposition at the outer side of the wheel body in engagement with said retaining means, and a trim member having retaining fingers engageable with a flange of the tire rim and provided with substantially rigid spoke elements flexibly joined to the inner portion of the trim member and engageable against the outer side of a margin of the hub cap under resilient tension by resilient flexing of said junctures and to appear as emanating from said outer margin of the hub cap.

2. In a wheel structure including a wheel body and a tire rim with retaining means on the wheel for a hub cap, a hub cap for disposition at the outer side of the wheel body in engagement with said retaining means, and a trim member having retaining fingers engageable with a flange of the tire rim and provided with substantially rigid spoke elements flexibly joined to the inner portion of the trim member and engageable against a margin of the hub cap under resilient tension by resilient flexing of said junctures, said spoke elements having side wing flanges engageable with the hub cap.

3. In a wheel structure including a wheel body and a tire rim with retaining means on the wheel for a hub cap, a hub cap for disposition at the outer side of the wheel body in engagement with said retaining means, and a trim member having retaining fingers engageable with a flange of the tire rim and provided with substantially rigid spoke elements flexibly joined to the inner portion of the trim member and engageable against a margin of the hub cap under resilient tension by resilient flexing of said junctures, tensioning of the spoke elements acting to enhance retaining engagement of the retaining fingers on the trim member.

4. In a wheel structure including a wheel body and a tire rim with retaining means on the wheel for a hub cap, a hub cap for disposition at the outer side of the wheel body in engagement with said retaining means, and a trim member having retaining fingers engageable with a flange of the tire rim and provided with substantially rigid spoke elements flexibly joined to the inner portion of the trim member and engageable against margin of the hub cap under resilient tension by resilient flexing of said junctures, said trim member having a series of reinforcing and pry-off annular ribs on the outer portion thereof.

5. In a wheel structure including a wheel body and a tire rim having an intermediate flange joining a terminal flange, a trim member for disposition over the tire rim and including a substantially rigid body portion including a portion for overlying the terminal flange and a generally axially inwardly extending annular continuous flange for disposition opposite the intermediate flange and arranged to extend to a substantial distance axially inwardly, retaining means on the inner margin of said trim flange for retaining engagement with the intermediate flange, and a series of generally radially inwardly and axially outwardly directed spoke elements engageable against the outer side of a hub cap disposable at the outer side of the wheel body.

6. In a wheel structure including a wheel body and a tire rim having an intermediate flange joining a terminal flange, a trim member for disposition over the tire rim and including a substantially rigid body portion including a portion for overlying the terminal flange and a generally axially inwardly extending annular continuous flange for disposition opposite the intermediate flange and arranged to extend to a substantial distance axially inwardly, retaining means on the inner margin of said trim flange for retaining engagement with the intermediate flange, and a series of generally radially inwardly and axially outwardly directed spoke elements engageable against the outer side of a hub cap disposable at the outer side of the wheel body, said spoke elements being placed under tension and thereby firmly engaging the hub cap without rattling in service and enhancing engagement under tension of said trim retaining means with the intermediate flange.

7. In a trim for disposition at the outer side of a vehicle wheel, a circular trim member having a generally radially outwardly directed outer portion and a generally axially inwardly directed flange provided at its inner terminus with trim retaining means and generally radially inwardly and axially outwardly directed spoke elements which are separated from one another inwardly from their connection with said flange and are individually relatively axially resiliently flexible.

8. In a trim for disposition at the outer side of a vehicle wheel, a circular trim member having a generally radially outwardly directed outer portion and a generally axially inwardly directed flange provided at its inner terminus with trim retaining means and generally radially inwardly and axially outwardly directed spoke elements, said spoke elements being separated from one another inwardly from their connection with said flange and provided with inner free tips having divergent side wing flanges with edge portions thereof generally conformed to bottom against the outer side of a hub cap and said edge portions merging into the inner free tips of the spoke elements.

References Cited in the file of this patent

UNITED STATES PATENTS

| | | |
|---|---|---|
| Re. 22,428 | Lyon | Feb. 1, 1944 |
| 2,092,975 | Hunt et al. | Sept. 14, 1937 |
| 2,198,056 | Lyon | Apr. 23, 1940 |
| 2,368,238 | Lyon | Jan. 30, 1945 |